US007957399B2

(12) United States Patent
Nice et al.

(10) Patent No.: US 7,957,399 B2
(45) Date of Patent: Jun. 7, 2011

(54) ARRAY-BASED ROUTING OF DATA PACKETS

(75) Inventors: Nir Nice, Kfar Veradim (IL); Anat Eyal, Tel Aviv (IL); Lior Alon, Haifa (IL); Ori Yosefi, Pardes-Hanna (IL); Samer Karim, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 255 days.

(21) Appl. No.: 12/339,109

(22) Filed: Dec. 19, 2008

(65) Prior Publication Data

US 2010/0157799 A1 Jun. 24, 2010

(51) Int. Cl.
 *H04L 12/28* (2006.01)
 *G06F 15/16* (2006.01)
(52) U.S. Cl. .................. 370/395.5; 370/401; 370/466; 709/245
(58) Field of Classification Search .......... 370/252, 370/389, 395.5, 401, 466; 709/245
See application file for complete search history.

(56) References Cited

U.S. PATENT DOCUMENTS

| | | | |
|---|---|---|---|
| 6,895,442 B1 * | 5/2005 | Khanna ................ | 709/245 |
| 7,246,175 B1 | 7/2007 | Tappan et al. | |
| 7,277,386 B1 | 10/2007 | Ferguson et al. | |
| 7,328,009 B2 | 2/2008 | Takeda et al. | |
| 7,328,237 B1 | 2/2008 | Thubert et al. | |
| 2003/0093560 A1 | 5/2003 | Ono et al. | |
| 2004/0240468 A1 * | 12/2004 | Chin et al. ............... | 370/466 |
| 2004/0264474 A1 * | 12/2004 | Sbida ..................... | 370/395.5 |
| 2005/0165786 A1 * | 7/2005 | Ahmed et al. ............ | 707/10 |
| 2006/0233106 A1 | 10/2006 | Achlioptas et al. | |
| 2007/0147421 A1 | 6/2007 | Kim | |
| 2008/0181103 A1 * | 7/2008 | Davies .................... | 370/230 |
| 2008/0198867 A1 | 8/2008 | Moll et al. | |

FOREIGN PATENT DOCUMENTS

| | | | |
|---|---|---|---|
| JP | 2006115551 A | 4/2006 | |
| KR | 100772537 B1 | 11/2007 | |

OTHER PUBLICATIONS

"International Search Report", Mailed Date: Jul. 22, 2010, Application No. PCT/US2009/067783, Filed Date: Dec. 11, 2009, pp. 10.
Hogg, Scott, "Internet Protocol Version 6 (Ipv6)", retrieved at <<http://technet.microsoft.com/en-us/library/bb727113.aspx>>, pp. 30.
"IPv6 Multi-Homing Architectural Roadmap—Requirements Extract", retrieved at <<http://arneill-py.sacramento.ca.us/ipv6mh/Requirements%20Extract.pdf>>, pp. 8. "Controlling your Migration to IPv6: A Gateway to Tomorrow", retrieved at http://www.f5.com/pdf/white-papers/ipv6-wp.pdf>>, pp. 3.
Lee, et al., "Internet Protocol Version 6", retrieved at http://www.gtri.com/docs/IPv6%20-&20The%20Next%20Generation%20Protocol%20v1-1.pdf>>, Oct. 7, 2008, pp. 13.
Windows Server 2008, "IPv6 Transition Technologies", Oct. 2003, pp. 47.

* cited by examiner

*Primary Examiner* — Seema S Rao
*Assistant Examiner* — Wanda Z Russell
(74) *Attorney, Agent, or Firm* — Toler Law Group, IP (57) ABSTRACT

A method of load balancing data packets at an array is disclosed. The method includes receiving a data packet encoded in a first format at an input of the array. The received data packet is assigned to an assigned element of the array, and the data packet is routed to a device. A message encoded in a second format is received from the device at the array. Information is extracted from a payload portion of the message, and the message is assigned to the assigned element of the array based on the information extracted from the payload portion of the message.

20 Claims, 8 Drawing Sheets

ARRAY-BASED ROUTING OF DATA PACKETS

BACKGROUND

Load balancing is typically performed based on a source internet protocol (IP) address or a destination IP address of each received data packet. When using IP version six (IPv6) transition technology, the source IP address and the destination IP address may not be directly visible to a load balancer. For example, IPv6 transition technologies, such as Teredo, 6 to 4, and Intra-Site Automatic Tunnel Addressing Protocol (ISATAP), embed the internet protocol version four (IPv4) source address information inside a data packet. Thus, load balancers may have difficulty in processing data packets encoded in the IPv6 transition technology formats.

SUMMARY

The present disclosure describes load balancing of data packets at an array. A data packet encoded in a first format is assigned to an element of the array and is routed to a device (e.g., a server). A message from the device (e.g., a reply), encoded in a second format, is received at the array. Based on information extracted from a payload portion of the message, the message is assigned to the same element (e.g., the assigned element) of the array.

For example, a data packet may arrive at the array encapsulated in an IPv4 format, destined for an IPv6 server of a corporate network. The data packet from the Internet side is routed to an element of the array based on a first hash function operation. A reply message from the IPv6 server arrives at a corporate side of the array as native IPv6 or as IPv6 embedded inside IPv4. Information embedded within the reply message is extracted from a payload portion of the message, and a second hash function operation is performed on the information extracted from the payload portion of the message. The reply message is assigned to the same element of the array as the data packet, resulting in bi-directional affinity at the array.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

In a particular embodiment, a method of load balancing data packets at an array is disclosed. The method includes receiving a data packet encoded in a first format at an input of the array. The received data packet is assigned to an assigned element of the array, and the data packet is routed to a device. A message encoded in a second format is received from the device. Information is extracted from a payload portion of the message, and the message is assigned to the assigned element of the array based on the information extracted from the payload portion of the message. An example of the first format is an internet protocol version four (IPv4) format, and an example of the second format is an internet protocol version six (IPv6) format.

In another particular embodiment, an array is disclosed that includes a network component, an extraction component, and an assignment component. The array includes multiple elements. The network component receives a message from a device encoded in a transition technology format. The extraction component extracts information from the message. The assignment component assigns the message to a first element of the array based on the information extracted from the message.

In another particular embodiment, a computer-readable medium is disclosed that includes instructions executable by a computer. The instructions, when executed by the computer, cause the computer to assign a data packet received at an array to an assigned element of the array. The data packet is encoded in a first format. The instructions, when executed by the computer, cause the computer to route the data packet to a device and to extract information from a payload portion of a message received from the device. The message is encoded in a second format. The instructions, when executed by the computer, cause the computer to assign the message to the assigned element of the array based on the information extracted from the payload portion of the message. At least one of the first format and the second format includes a transition technology format.

Figure 1:
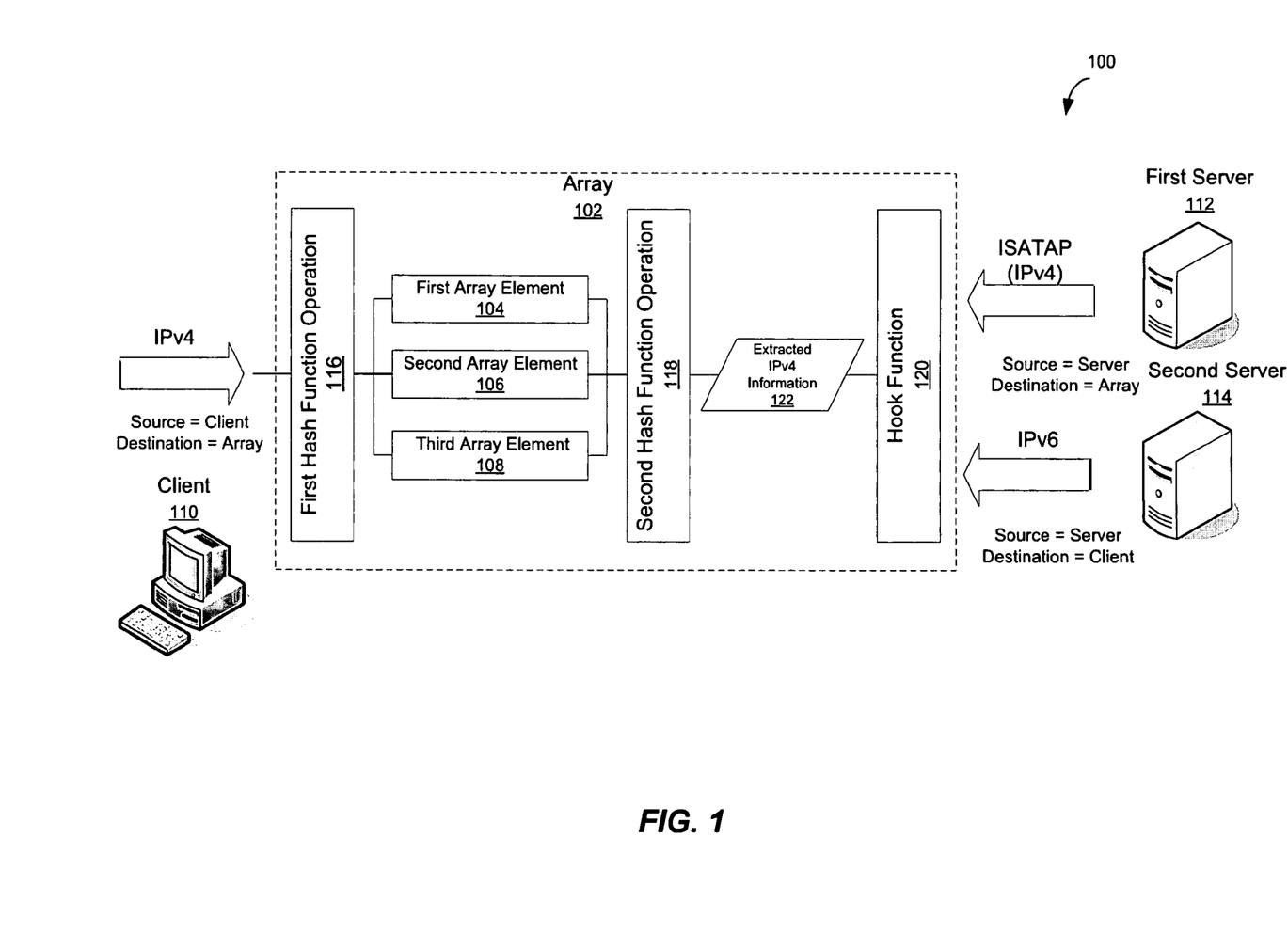
FIG. 1 is a block diagram to illustrate a first particular embodiment of a load balancing system.

Referring to FIG. 1, a block diagram of a load balancing system is illustrated and generally designated 100. The system 100 includes an array 102, a client 110, a first server 112, and a second server 114. The array 102 includes multiple array elements. For example, in the embodiment illustrated in FIG. 1, the array 102 includes a first array element 104, a second array element 106, and a third array element 108.

Traffic from the client 110 arrives over a network (e.g., the Internet) and is received at the array 102 as internet protocol version six (IPv6) traffic encapsulated in an internet protocol version four (IPv4) format. A first hash function operation 116 is performed on the traffic from the client 110. Based on the results of the first hash function operation 116, the traffic from the client 110 is routed to one of the elements of the array 102. For illustration purposes, the traffic from the client 110 may be routed to the first array element 104 based on the results of the first hash function operation 116.

Traffic from the server side may arrive over a second network (e.g., a corporate network) as native IPv6 traffic, with the source identified by the IPv6 address of the server and the destination identified as the IPv6 address of the client 110. For example, traffic from the second server 114 arrives at the array 102 as native IPv6 traffic. Alternatively, traffic from the server side may arrive as IPv4 traffic that encapsulates the IPv6 information, with the source as the IPv4 address of the server and the destination as the IPv4 address of the array 102. For example, traffic from the server side may arrive in a transition technology format. Examples of transition technology formats include a Teredo transition technology format, a 6 to 4 transition technology format, and an Intra-Site Automatic Tunnel Addressing Protocol (ISATAP) transition technology format. In the embodiment illustrated in FIG. 1, traffic from the first server 112 arrives at the array 102 as ISATAP IPv4 traffic that encapsulates the IPv6 information.

By extracting IPv4 information from the server side traffic, the server side traffic may be assigned to the same array element as traffic from the client side, allowing bi-directional affinity at the array 102. In a particular embodiment, the IPv4 information is extracted as extracted IPv4 information 122 using a hook function 120. For example, IPv4 information may be extracted from traffic from the first server 112 (e.g., from a payload portion of a data packet). Based on the extracted IPv4 information 122, the traffic from the first server 112 may be assigned to the same array element as traffic from the client 110. In the example described above, traffic from the client 110 is routed to the first array element 104 based on the first hash function operation 116. The extracted IPv4 information 122 may be used in a second hash function operation 118 to assign the traffic from the first server 112 destined for the client 110 to the first array element 104, resulting in bi-directional affinity at the array 102.

Similarly, IPv4 information may be extracted from traffic from the second server 114. In a particular embodiment, the extracted IPv4 information 122 is extracted using the hook function 120. Based on the extracted IPv4 information 122, the traffic from the second server 114 may be assigned to the same array element as traffic from the client 110. In the example described above, traffic from the client 110 is routed to the first array element 104 based on the first hash function operation 116. The extracted IPv4 information 122 may be used by the second hash function operation 118 to assign the traffic destined for the client 110 from the second server 114 to the first array element 104, resulting in bi-directional affinity at the array 102.

Thus, in either case (e.g., native IPv6 traffic from the second server 114 or IPv6 traffic encapsulated in IPv4 from the first server 112), the second hash function operation 118 is not performed on the transition technology traffic or on the native IPv6 traffic. Rather, values (e.g., IPv4 information) are extracted from a payload portion of a message. The extracted values are the same as the values that were used by the first hash function operation 116. As such, the result of the second hash function operation 118 on the server side is the same as the result of the first hash function operation 116 on the client side.

Figure 2:
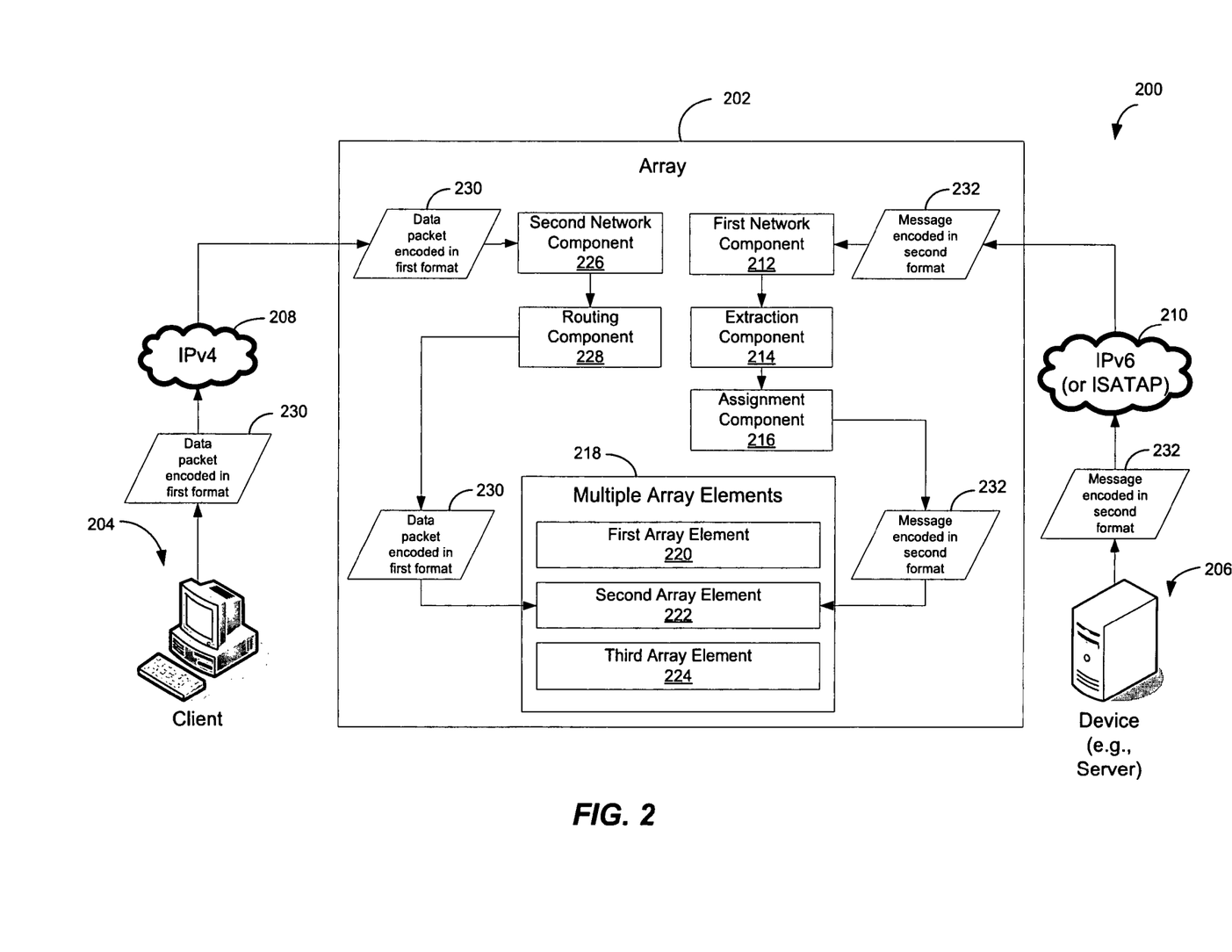
FIG. 2 is a block diagram to illustrate a second particular embodiment of a load balancing system.

Referring to FIG. 2, a block diagram of a second particular embodiment of a load balancing system is illustrated at 200. The system 200 includes an array 202, a client 204, and a device 206 (e.g., a server). The client 204 communicates with the array 202 via an internet protocol version four (IPv4) network 208. The device 206 communicates with the array 202 via an internet protocol version six (IPv6) or ISATAP (IPv4) network 210. The array 202 includes a first network component 212, an extraction component 214, an assignment component 216, and multiple array elements 218. For example, in the embodiment illustrated in FIG. 2, the array 202 includes a first array element 220, a second array element 222, and a third array element 224. In the embodiment illustrated, the array 202 includes a second network component 226 and a routing component 228.

In operation, the client 204 transmits a data packet 230 to the array 202 via the IPv4 network 208. In the embodiment illustrated in FIG. 2, the data packet 230 is encoded in a first format. For example, the first format may include a transition technology format, including a Teredo transition technology format, a 6 to 4 transition technology format, or an ISATAP transition technology format. The data packet 230 is received at the second network component 226 of the array 202. In a particular embodiment, the data packet 230 includes an IPv4 packet, and an IPv6 address embedded in the IPv4 packet may be extracted.

The routing component 228 routes (i.e., assigns) the received data packet 230 to a device (e.g., device 206) via one of the multiple array elements 218 (e.g., an assigned element). For example, in the embodiment shown, the data packet 230 is routed (i.e., assigned) to the second array element 222. Thus, in this case, the second array element 222 is the assigned element. The data packet 230 is assigned to the assigned element (e.g., the second array element 222) based on a first hash function operation. The data packet 230 is thereafter routed to a destination device, such as the device 206.

The device 206 sends a message 232 in reply to the data packet 230 from the client 204. In the embodiment illustrated in FIG. 2, the message 232 is encoded in a second format. For example, the second format may include a native IPv6 format or a transition technology format. For example, the message 232 may be encoded in a Teredo transition technology format, a 6 to 4 transition technology format, or an ISATAP transition technology format.

In the Teredo transition technology format (as described below with respect to FIG. 3), the message 232 includes an IPv6 address assigned to the client device (e.g., the client 204), and the IPv6 address includes an IPv4 address of a Teredo server, an IPv4 address associated with the client 204, and a port associated with the client 204. For example, the IPv4 address associated with the client 204 may be assigned to the client 204. Alternatively, the IPv4 address associated with the client 204 may be assigned to a network address translation (NAT) device (as described below with respect to FIG. 6).

Figure 3:
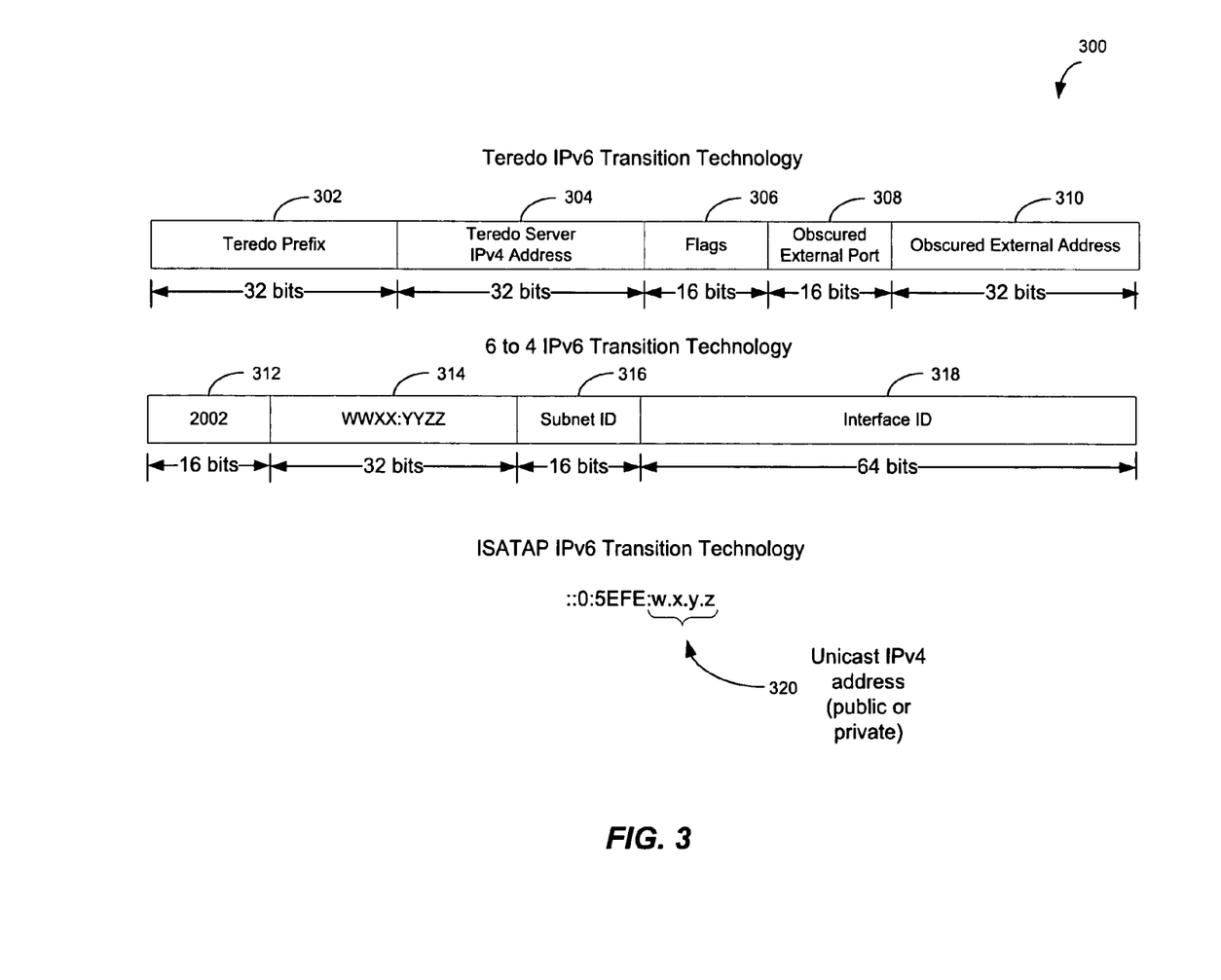
FIG. 3 is a block diagram to illustrate several IPv6 transition technology formats.

As another example, the message 232 may be encoded in a 6 to 4 transition technology format (as described with respect to FIG. 3). In the 6 to 4 transition technology format, the message 232 includes a 6 to 4 address assigned to a client device (e.g., the client 204). The 6 to 4 address also includes a portion that represents an IPv6 address assigned to a host device.

As a further example, the message 232 may be encoded in an ISATAP transition technology format (as described with respect to FIG. 3). In the ISATAP transition technology format, the message 232 includes an ISATAP address assigned to a client device (e.g., the client 204). The ISATAP address also includes a unicast IPv4 address (e.g., a public or private address).

The first network component 212 of the array 202 receives the message 232 transmitted from the device 206 via the IPv6 or ISATAP (IPv4) network 210. The extraction component 214 extracts an IP address from the message 232. The extracted IP address may be used by the assignment component 216 to assign the message 232 to one of the multiple array elements 218, based on a second hash function operation. In the embodiment illustrated, the assignment component 216 assigns the message 232 to the second array element 222 of the multiple array elements 218 based on the second hash function operation. In a particular embodiment, a combination of an IPv4 address and a port number is used as an input to the second hash function operation. Thus, the message 232 is assigned to the same array element as the data packet 230 received from the client 204, resulting in bi-directional affinity at the array 202.

Referring to FIG. 3, a block diagram of several IPv6 transition technology formats is illustrated at 300. An IPv6 address in the Teredo transition technology format contains a Teredo prefix 302, a Teredo Server IPv4 address 304, one or more flags 306, an obscured external port 308, and an obscured external address 310. As shown, the Teredo prefix 302 is represented by thirty two bits; the Teredo Server IPv4 address is represented by 32 bits; the flags 306 are represented by 16 bits; the obscured external port is represented by 16 bits; and the obscured external address 310 is represented by thirty two bits.

When using the Teredo IPv6 transition technology format, a client is assigned an IPv6 address that contains the Teredo Server IPv4 address 304, as well as the IPv4 address (and port) of the client (e.g., the obscured external address 310 and obscured external port 308). The IPv4 address of the client (e.g., the obscured external address 310) may be the IPv4 address of the client or the IPv4 address of a network address translation (NAT) device behind which the client resides (as discussed with reference to FIG. 6).

An IPv6 address in the 6 to 4 transition technology format contains a prefix 312 (e.g., 2002), a portion 314 (e.g., WWXX:YYZZ) that represents an IPv4 address (e.g., W.X.Y.Z) assigned to a site or a host, a subnet ID 316, and an interface ID 318. As shown, the 6 to 4 prefix 312 is represented by sixteen bits; the portion 314 is represented by thirty two bits; the subnet ID 316 is represented by sixteen bits; and the interface ID 318 is represented by sixty four bits.

An IPv6 address in the ISATAP transition technology format is of the form "::0:5EFE:w.x.y.z", in which "w.x.y.z" 320 is any unicast IPv4 address (public or private).

Figure 4:
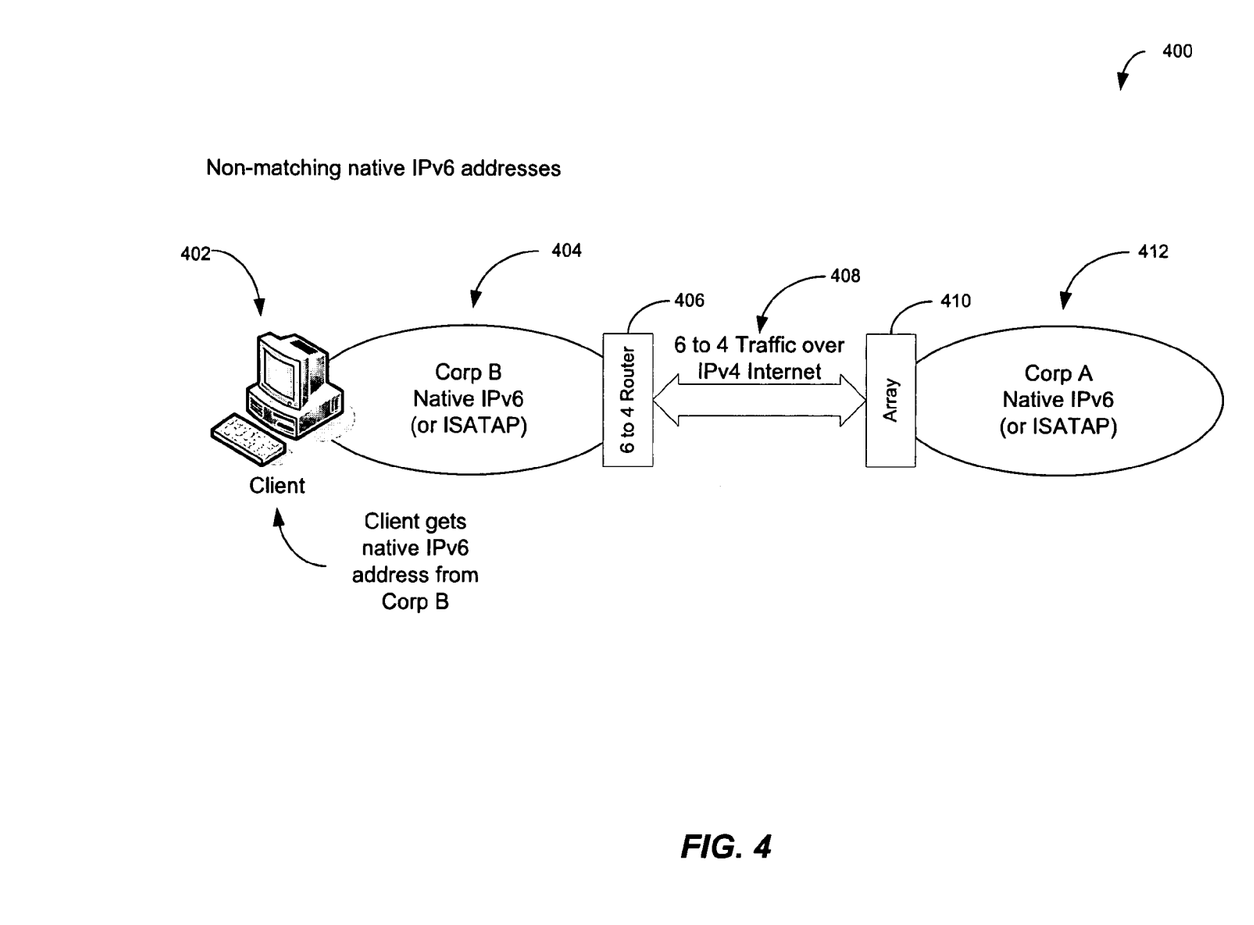
FIG. 4 is a block diagram to illustrate a third particular embodiment of a load balancing system.

Referring to FIG. 4, a block diagram of a third particular embodiment of a load balancing system is illustrated at 400. In a 6 to 4 transition technology format, a client IPv6 address may not be assigned by a 6 to 4 router. As illustrated in FIG. 4, a client 402 may be located on a native IPv6 network 404 (and may be assigned a native IPv6 address). For example, the native IPv6 network 404 may be a first corporate (e.g., Corp B) IPv6 network. The native IPv6 network 404 is connected to the Internet through a 6 to 4 router 406. As illustrated, 6 to 4 traffic 408 is communicated over the Internet to a load balancing (LB) array 410, connected to another network 412 (e.g., a native IPv6 network or ISATAP network). For example, the other network 412 may be a second corporate (e.g., Corp A) network.

In a particular embodiment, the first corporate network 404 (e.g., the native IPv6 network of Corp B) has a fixed IPv6 prefix. A hook function may monitor traffic that comes from the client 402 in order to determine the fixed IPv6 prefix of the Corp B network. The hook function may extract the IPv6 address of the client 402 that is embedded within a 6 to 4 IPv4 packet. On the second corporate network side of the array 410 (e.g., Corp A network 412), when the hook function is called, the hook function determines whether a native IPv6 address is the destination address. If the destination address is a native IPv6 address, the hook function returns the IPv6 address of the client 402 that was extracted from the 6 to 4 IPv4 packet.

Figure 5:
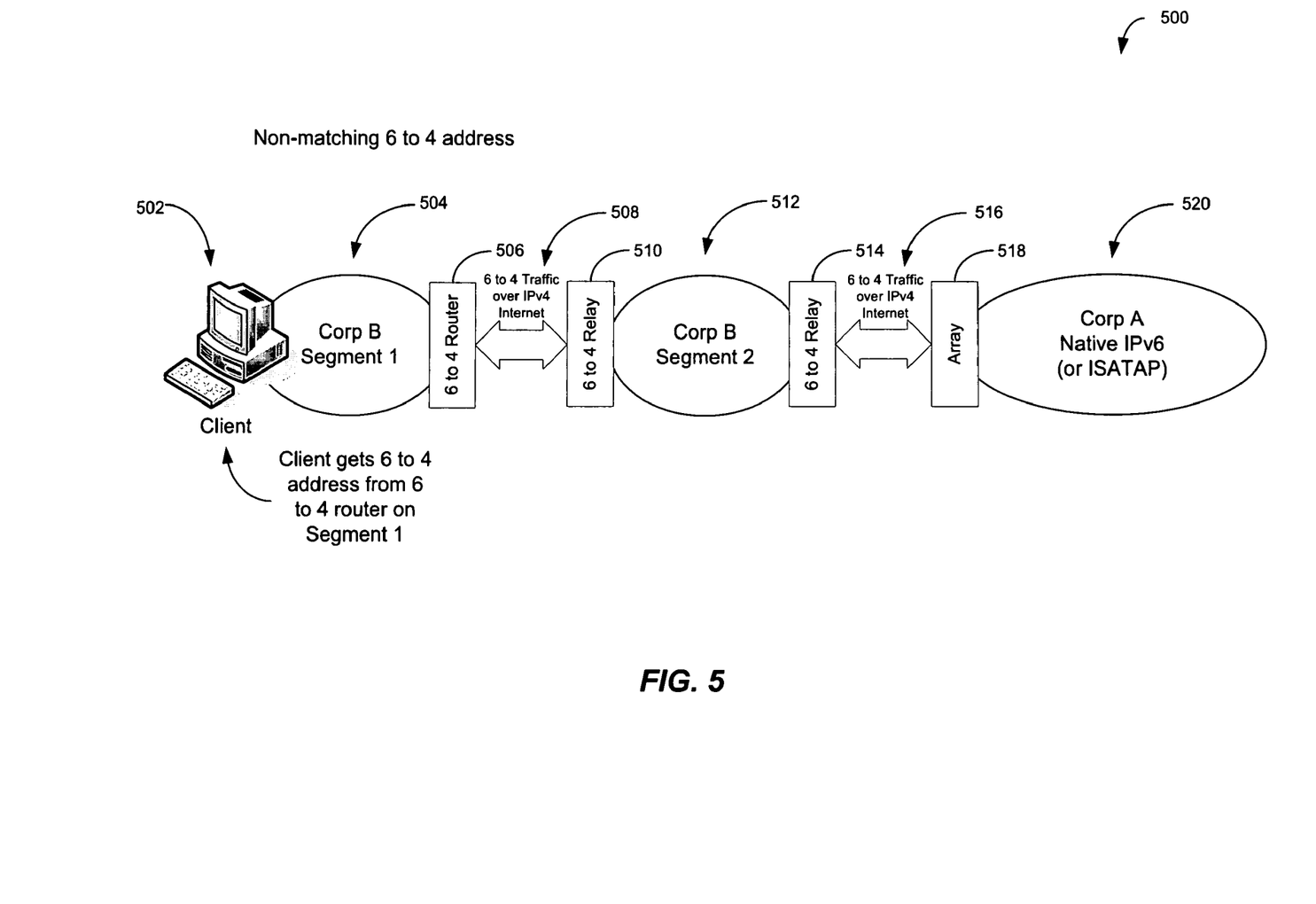
FIG. 5 is a block diagram to illustrate a fourth particular embodiment of a load balancing system.

Referring to FIG. 5, a block diagram of a fourth particular embodiment of a load balancing system is illustrated at 500. In a 6 to 4 transition technology format, a client may be assigned an IPv6 address by a 6 to 4 router that is different from a 6 to 4 router that delivers a data packet to an array. For example, in the embodiment illustrated in FIG. 5, a client 502 receives a 6 to 4 IPv6 address from a 6 to 4 router 506 on a first segment 504 (e.g., Segment 1 on the Corp B network). The 6 to 4 router 506 on the first segment 504 communicates 6 to 4 traffic over the Internet, as shown at 508, to a 6 to 4 relay 510. The 6 to 4 relay 510 is coupled to a second segment 512 (e.g., Segment 2 on the Corp B network) that is coupled to another 6 to 4 relay 514. The other 6 to 4 relay 514 communicates 6 to 4 traffic over the Internet, as shown at 516, to an array 518 on another network 520 (e.g., a native IPv6 network or an ISATAP network). For example, the other network 520 may be a corporate (e.g., Corp A) network. Thus, the client 502 is assigned a 6 to 4 IPv6 address that belongs to a 6 to 4 router (e.g., the 6 to 4 router 506) that is different from the 6 to 4 router that delivered the data packet to the array 518 (e.g., the 6 to 4 relay 514).

On the corporate network side (e.g., the Corp A network 520), a hook function observes a 6 to 4 address as a destination IPv6 address of the client 502. In a particular embodiment, segmentation may be determined at the array 518 for each received data packet. In another particular embodiment, the array 518 may determine whether segmentation has already been determined for a particular 6 to 4 IPv6 address.

Figure 6:
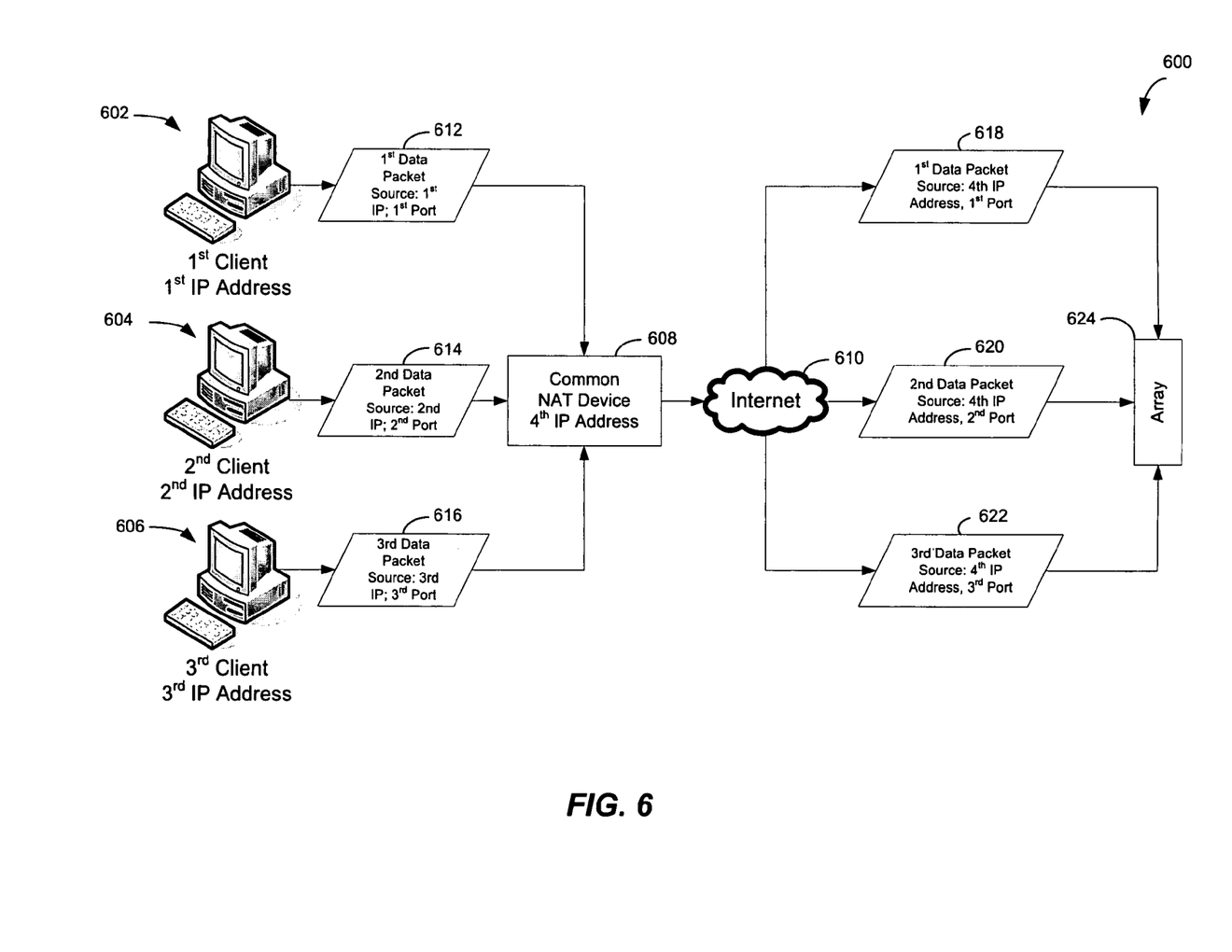
FIG. 6 is a block diagram to illustrate a fifth particular embodiment of a load balancing system.

Referring to FIG. 6, a block diagram of a fifth particular embodiment of a load balancing system is illustrated at 600. The system 600 includes multiple clients behind a common network address translation (NAT) device 608. For example, in the embodiment illustrated in FIG. 6, a first client 602, a second client 604, and a third client 606 are behind the common NAT device 608, connected to the Internet 610. Each of the clients 602-606 behind the common NAT device 608 appears on the Internet side of an array 624 to have the same source IP address (e.g., the IPv4 address of the common NAT device 608). Further, each of the clients 602-606 has the same obscured external address (e.g., the IPv4 address of the common NAT device 608). Thus, the first client device 602, the second client device 604, and the third client device 604 appear on the Internet side of the array 624 with the IPv4 address of the common NAT device 608. For example, a first client side data packet 612 from the first client 602 (e.g., with a first IP address and first port information) appears on the Internet side of the array 624 as the first Internet side data packet 618 with the same IP address as the common NAT device 608 (e.g., a fourth IP address). Similarly, a second client side data packet 614 from the second client 604 (e.g., with a second IP address and second port information) and a third client side data packet 616 from the third client 606 (e.g., with a third IP address and third port information) appear on the Internet side of the array 624 as a second Internet side data packet 620 and a third Internet side data packet 622 with the IPv4 address of the common NAT device 608 (e.g., the fourth IP address).

Typically, this does not significantly impact load distribution on elements of an array, as it is statistically likely that clients are distributed behind different NAT devices. However, in some cases, using only the IPv4 address (e.g., the IPv4 address of the common NAT device 608) may cause overloading of one element of the array (e.g., the array 624). Such a case of overloading may occur when many remote users all appear behind a common NAT device. For example, at a convention, many users may remotely connect to the same corporate network from behind the common NAT device.

To overcome this potential problem, the IPv4 address may be combined with a port number (e.g., the obscured external port 308 as described in FIG. 3) to create a new value on which a hash operation is performed. This hash operation may be performed on both the Internet side and the corporate network side of an array. In a particular embodiment, the hash operation is performed only on Teredo addresses. For example, a first port corresponding to the first client 602 may be embedded within the first Internet side data packet 618 from the common NAT device 608. The first port may be extracted from the first Internet side data packet 618 to perform the hash operation. As another example, a second port corresponding to the second client 604 may be embedded within the second Internet side data packet 620. The second port may be extracted from the second Internet side data packet 620 to perform the hash operation. As a further example, a third port corresponding to the third client 606 may be embedded within the third Internet side data packet 622. The third port may be extracted from the third Internet side data packet 622 to perform the hash operation. In a particular embodiment, the hash operation may be used to assign packets to elements of the array 624.

Figure 7:
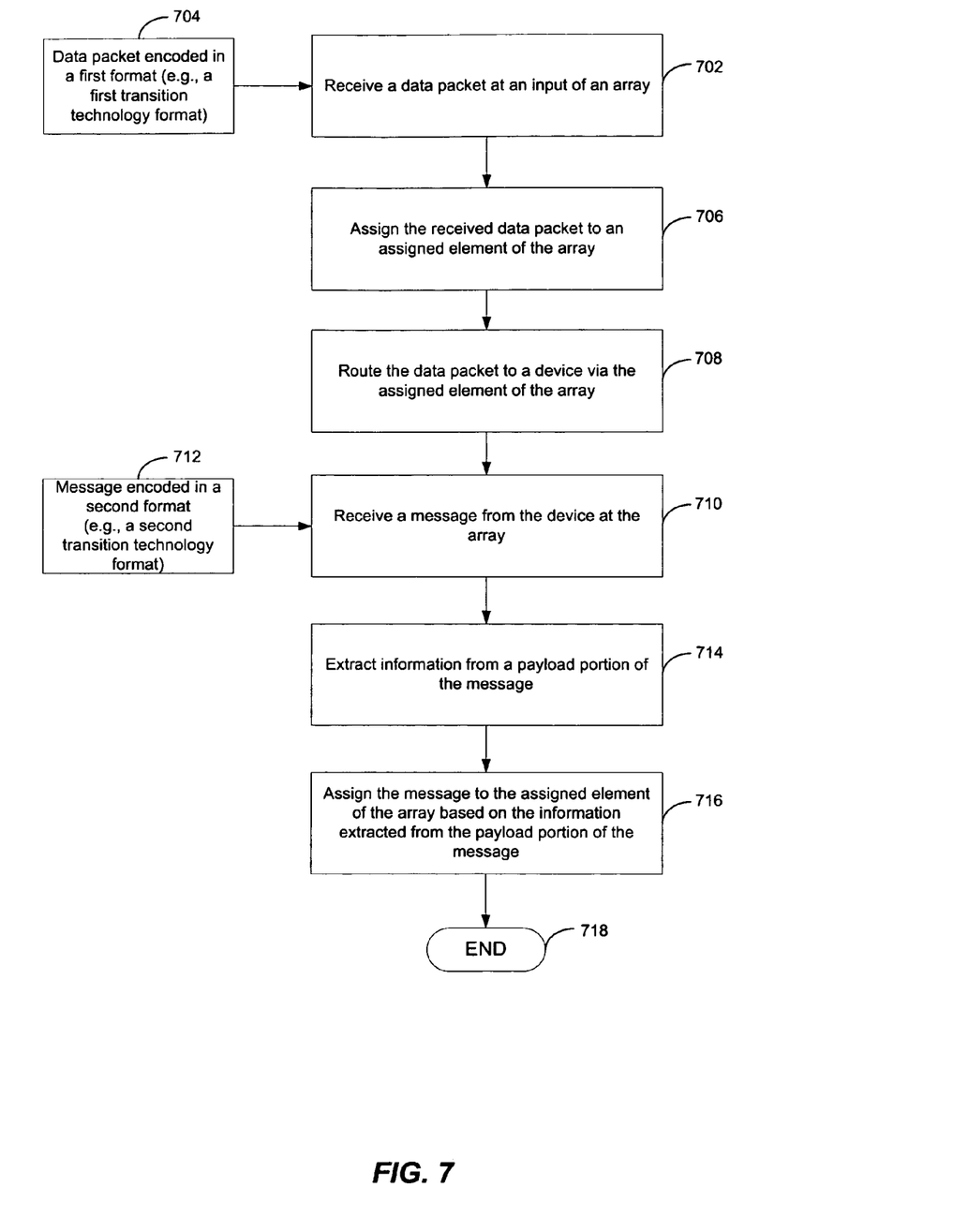
FIG. 7 is a flow diagram to illustrate a particular embodiment of a load balancing method.

Referring to FIG. 7, a flow diagram of a particular embodiment of a load balancing method is illustrated. The method includes receiving a data packet 704 encoded in a first format at an input of an array, at 702. In a particular embodiment, the data packet 704 is an IPv4 packet, and an IPv6 address embedded in the IPv4 packet is extracted from the data packet 704. The data packet 704 may be encoded in a transition technology format and may include IPv4 content. For example, the transition technology format may include a Teredo IPv6 transition technology format, a 6 to 4 IPv6 transition technology format, or an ISATAP IPv6 transition technology format.

In the case of a Teredo IPv6 transition technology format, the data packet 704 includes an IPv6 address assigned to a client device, and the IPv6 address includes an IPv4 address of a Teredo server, an IPv4 address associated with the client device, and a port associated with the client device. In a particular embodiment, the IPv4 address associated with the client device (e.g., the client 204 of FIG. 2) includes a client address. In another particular embodiment the IPv4 address associated with the client device includes an address of a network address translation (NAT) device (e.g., the NAT device 608 of FIG. 6). In the case of a 6 to 4 transition technology format, the data packet 704 includes a 6 to 4 address assigned to a client device, and the 6 to 4 address includes a portion that represents an IPv6 address assigned to a host device. In the case of an ISATAP transition technology format, the data packet 704 includes an ISATAP address assigned to a client device, and the ISATAP address includes a unicast IPv4 address (e.g., a public or private unicast address).

The received data packet 704 is assigned to an assigned element of the array, at 706. In a particular embodiment, the data packet 704 is assigned to the assigned element of the array based on a first hash function operation. In an illustrative embodiment, a combination of an IPv4 address and a port number is used as an input to the first hash function (e.g., in the case of multiple client devices behind a single NAT device, as illustrated in FIG. 6).

The method includes routing the data packet 704 to a device via the assigned element of the array, at 708. For example, the device may include a server, and a destination address of the server may include an IPv6 address. As another example, the destination address of the device (e.g., the server) may include an address type other than an IPv4 address type. For example, the address type may include an internet transition technology address type.

A message 712 is received from the device at the array, at 710. The message 712 may be encoded in a second format. The second format may include a native IPv6 format or an ISATAP format. Information is extracted from a payload portion of the message, at 714. The message 712 is assigned to the assigned element of the array based on the information extracted from the payload portion of the message, at 716. In a particular embodiment, the message 712 is assigned to the assigned element of the array based on a second hash function operation. The message 712 may be assigned such that the data packet 704 and the message 712 are assigned to the same element of the array in order to maintain bi-directional affinity at the array. The method ends at 718.

Figure 8:
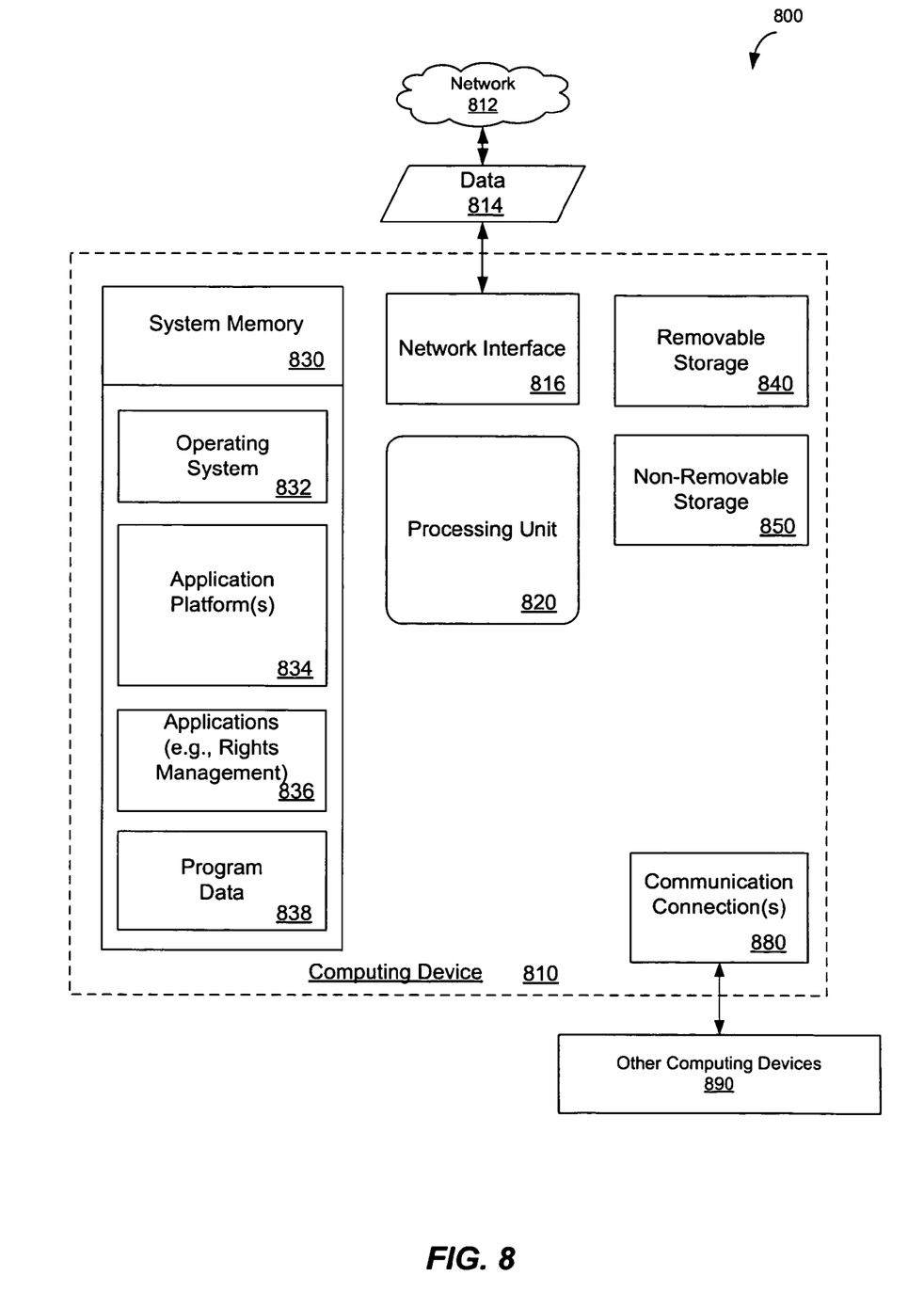
FIG. 8 is a block diagram of an illustrative embodiment of a general computer system.

FIG. 8 shows a block diagram of a computing environment 800 including a general purpose computer device 810 operable to support embodiments of computer-implemented methods and computer program products according to the present disclosure. In a basic configuration, the computing device 810 includes an array, as described with reference to FIGS. 1-2 and 4-6.

The computing device 810 typically includes at least one processing unit 820 and system memory 830. Depending on the exact configuration and type of computing device, the system memory 830 may be volatile (such as random access memory or "RAM"), non-volatile (such as read-only memory or "ROM," flash memory, and similar memory devices that maintain the data they store even when power is not provided to them) or some combination of the two. The system memory 830 typically includes an operating system 832, one or more application platforms 834, one or more applications 836, and may include program data 838.

The computing device 810 may also have additional features or functionality. For example, the computing device 810 may also include removable and/or non-removable additional data storage devices, such as magnetic disks, optical disks, tape, and standard-sized or miniature flash memory cards. Such additional storage is illustrated in FIG. 8 by removable storage 840 and non-removable storage 850. Computer storage media may include volatile and/or non-volatile storage and removable and/or non-removable media implemented in any method or technology for storage of information such as computer-readable instructions, data structures, program components or other data. The system memory 830, the removable storage 840 and the non-removable storage 850 are all examples of computer storage media. The computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 810. Any such computer storage media may be part of the device 810.

The computing device 810 includes at least one network interface 816 to send and receive data 814 (e.g., packets from a client 110 and messages from servers 112 and 114, as in FIG. 1) via a network 812. The computing device 810 also contains one or more communication connections 880 that allow the computing device 810 to communicate with other computing devices 890 (such as servers 112 and 114 of FIG. 1) over a wired or a wireless network. The one or more communication connections 880 are an example of communication media. By way of example, and not limitation, communication media may include wired media such as a wired network or direct-wired connection, and wireless media such as acoustic, RF, infrared and other wireless media. It will be appreciated, however, that not all of the components or devices illustrated in FIG. 8 or otherwise described in the previous paragraphs are necessary to support embodiments as herein described.

The steps of a method or algorithm described in connection with the embodiments disclosed herein may be embodied directly in hardware, in a software component executed by a processor, or in a combination of the two. A software component may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an integrated component of a computing device. In the alternative, the processor and the storage medium may reside as discrete components in a computing device.

Those of skill would further appreciate that the various illustrative logical blocks, configurations, modules, and algorithm steps described in connection with the embodiments disclosed herein may be implemented as electronic hardware, computer software, or combinations of both. To clearly illustrate this interchangeability of hardware and software, various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

A software module may reside in computer readable media, such as random access memory (RAM), flash memory, read only memory (ROM), registers, hard disk, a removable disk, a CD-ROM, or any other form of storage medium known in the art. An exemplary storage medium is coupled to the processor such that the processor can read information from, and write information to, the storage medium.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of routing data packets at an array element of a memory, the method comprising:
    receiving a data packet encoded in a first format at an input of the array, the array including a plurality of numbered elements;
    assigning the received data packet to an assigned element of the array, wherein the assigned element is one of the plurality of elements of the array;
    routing the data packet to a device via the assigned element of the array;
    receiving a message from the device at the array, wherein the message is encoded in a second format;
    extracting information from a payload portion of the message; and
    assigning the message to a second element of the array based on the information extracted from the payload portion of the message, wherein the second element is the same element as the assigned element of the array.

2. The method of claim 1, wherein the message is encoded in an internet protocol version six (IPv6) transition technology format, and wherein the message includes internet protocol version four (IPv4) information, and wherein the IPv4 information is extracted from the payload portion of the message.

3. The method of claim 1, wherein the message is encoded in a native internet protocol version six (IPv6) format, wherein the message includes internet protocol version four (IPv4) information, and wherein the IPv4 information is extracted from the payload portion of the message.

4. The method of claim 1, wherein the data packet is assigned to the assigned element of the array based on a first hash function operation, and wherein the message is assigned to the assigned element of the array based on a second hash function operation.

5. The method of claim 1, wherein the device includes a server having a destination address, and wherein the destination address of the server includes an internet protocol version six (IPv6) address.

6. The method of claim 1, wherein the data packet is routed to a destination address of the device, and wherein the destination address of the device includes an address type other than an internet protocol version four (IPv4) address type.

7. The method of claim 4, wherein the message is encoded in a Teredo transition technology format, wherein the message includes an internet protocol version six (IPv6) address assigned to a client device, and wherein the IPv6 address includes an internet protocol version four (IPv4) address of a Teredo server, an IPv4 address associated with the client device, and a port associated with the client device, and wherein the IPv4 address associated with the client device and the port is applied to the second hash function operation.

8. The method of claim 7, wherein the IPv4 address associated with the client device includes one of a client address and an address of a network address translation (NAT) device.

9. The method of claim 1, wherein the message is encoded in a 6 to 4 transition technology format, and wherein the message includes a 6 to 4 address assigned to a client device, and wherein the 6 to 4 address includes a portion that represents an internet protocol version six (IPv6) address assigned to a host device.

10. The method of claim 1, wherein the message is encoded in an ISATAP transition technology format, and wherein the message includes an ISATAP address assigned to a client device, and wherein the ISATAP address includes a unicast internet protocol version four (IPv4) address.

11. The method of claim 1, wherein the message is assigned to the second element of the array based on a hash function, and wherein a combination of an internet protocol version four (IPv4) address and a port number is used as an input to the hash function.

12. The method of claim 1, wherein the data packet includes an internet protocol version four (IPv4) packet, and wherein the method further comprises extracting an internet protocol version six (IPv6) address embedded in the IPv4 packet.

13. The method of claim 1, wherein routing the data packet to the assigned element and assigning the message to the second element that is the same as the assigned element results in bi-directional affinity at the array.

14. An array of a memory, comprising:
a first network component to receive a data packet;
a routing component to route the received data packet to a first element of the array;
a second network component to receive a message from a device, wherein the message is encoded in a transition technology format;
an extraction component to extract information from the message; and
an assignment component to assign the message to a second element of the array based on the information extracted from the message, wherein the array includes multiple elements, and wherein the second element is the same element as the first element of the array.

15. The method array of claim 14, wherein routing the data packet and the message to the first same element of the array results in bi-directional affinity at the array.

16. The array of claim 14, wherein the message is received via a native internet protocol version six (IPv6) network.

17. A computer-readable medium storing instructions, but not a propagated data signal, the instructions, when executed by a computer, cause the computer to:

assign a data packet received at an array to an assigned element of the array, wherein the data packet is encoded in a first format;
route the data packet to a device;
extract information from a payload portion of a message received from the device at the array, wherein the message is encoded in a second format; and
assign the message to a second element of the array based on the information extracted from the payload portion of the message, wherein the second element is the same as the assigned element of the array;
wherein at least one of the first format and the second format includes a transition technology format.

18. The computer-readable medium of claim 17, wherein the first format is a first transition technology format and the second format is a second transition technology format.

19. The method of claim 4, wherein the first hash function operation is applied to first values associated with the data packet and the second hash function operation is applied to second values associated with the extracted information, and wherein the first values are the same as the second values.

20. The method of claim 19, wherein a result of the first hash function operation is the same as a result of the second hash function operation.

* * * * *

UNITED STATES PATENT AND TRADEMARK OFFICE
CERTIFICATE OF CORRECTION

PATENT NO. : 7,957,399 B2  
APPLICATION NO. : 12/339109  
DATED : June 7, 2011  
INVENTOR(S) : Nir Nice et al.

Page 1 of 1

It is certified that error appears in the above-identified patent and that said Letters Patent is hereby corrected as shown below:

In column 11, line 21, in Claim 15, after "The" delete "method".

In column 11, line 22, in Claim 15, after "to the" delete "first".

Signed and Sealed this  
Ninth Day of August, 2011

David J. Kappos  
*Director of the United States Patent and Trademark Office*